United States Patent
Stadtlander et al.

(10) Patent No.: US 10,196,979 B2
(45) Date of Patent: Feb. 5, 2019

(54) ACOUSTIC PANEL REPAIR METHODS AND APPARATUS

(71) Applicant: United Technologies Corporation, Hartford, CT (US)

(72) Inventors: Daniel M. Stadtlander, West Hartford, CT (US); Christopher S. Leoni, Peachtree City, GA (US)

(73) Assignee: United Technologies Corporation, Farmington, CT (US)

( * ) Notice: Subject to any disclaimer, the term of this patent is extended or adjusted under 35 U.S.C. 154(b) by 445 days.

(21) Appl. No.: 14/948,762

(22) Filed: Nov. 23, 2015

(65) Prior Publication Data
US 2016/0153358 A1 Jun. 2, 2016

Related U.S. Application Data

(60) Provisional application No. 62/086,332, filed on Dec. 2, 2014.

(51) Int. Cl.
| | | |
|---|---|---|
| *F02C 7/045* | (2006.01) | |
| *F02C 7/24* | (2006.01) | |
| *F16F 9/30* | (2006.01) | |
| *B23P 6/00* | (2006.01) | |

(52) U.S. Cl.
CPC .............. *F02C 7/045* (2013.01); *B23P 6/00* (2013.01); *F02C 7/24* (2013.01); *F16F 9/306* (2013.01); *F05D 2220/32* (2013.01); *F05D 2230/60* (2013.01); *F05D 2250/283* (2013.01); *F05D 2260/96* (2013.01)

(58) Field of Classification Search
CPC ..... F02C 7/045; F02C 7/24; B23P 6/00; F16F 9/306; F05D 2260/96; F05D 2230/60; F05D 2220/32; F05D 2250/283
See application file for complete search history.

(56) References Cited

U.S. PATENT DOCUMENTS

| | | |
|---|---|---|
| 5,151,311 A | 9/1992 | Parente et al. |
| 5,175,401 A | 12/1992 | Arcas et al. |
| 5,653,836 A | 8/1997 | Mnich et al. |
| 5,807,628 A | 9/1998 | Mnich et al. |
| 6,176,964 B1 | 1/2001 | Parente et al. |
| 8,592,024 B2 | 11/2013 | Stadtlander et al. |
| 2008/0020176 A1* | 1/2008 | Ayle ........................ F02C 7/045 428/118 |
| 2013/0313039 A1 | 11/2013 | Common et al. |

FOREIGN PATENT DOCUMENTS

WO 94/26994 A1 11/1994

* cited by examiner

*Primary Examiner* — Ryan J Walters
(74) *Attorney, Agent, or Firm* — Bachman & LaPointe, P.C.

(57) ABSTRACT

In a method for processing an acoustic panel (22), the panel comprises: a sheet (42) having a first face (44), a second face (46), and apertures (48) open to the first face and second face; and a mesh (60) along the first face. The method comprises forcing the mesh into a plurality of the apertures.

10 Claims, 7 Drawing Sheets

ACOUSTIC PANEL REPAIR METHODS AND APPARATUS

CROSS-REFERENCE TO RELATED APPLICATION

Benefit is claimed of U.S. Patent Application No. 62/086,332, filed Dec. 2, 2014, and entitled "Acoustic Panel Repair Methods and Apparatus", the disclosure of which is incorporated by reference herein in its entirety as if set forth at length.

BACKGROUND

The disclosure relates to gas turbine engines. More particularly, the disclosure relates to acoustic panels.

An exemplary acoustic panel, generally referred to as a panel, is shown in U.S. Pat. No. 5,151,311, issued Sep. 29, 1992. Such a panel comprises a honeycomb core. A backing sheet is secured to one face of the core. A foraminate (e.g., perforated) face sheet is secured along the opposite face. A wire mesh is secured along the outer face of the face sheet. Various metallic and non-metallic materials have been used for the core and sheets. Similarly, a variety of adhesives are used for securing the sheets to the core and the mesh to the face sheet.

Failure of the adhesive securing the mesh to the face sheet is one failure mode. The amount and nature of the adhesive initially used in panel assembly is limited by the desire to not excessively block the mesh openings. Exemplary failure involves delamination over an area. Delamination may be accompanied by a rupture (e.g., a simple tear or a loss of some area of material) or not.

Delamination risks further loss of mesh. To prevent such further loss one may need to replace the affected panel, taking an aircraft out of service. One may alternatively resecure the delaminated material. Adhesive resecuring raises issues of occluding the mesh openings. It also may require that the engine/aircraft be taken out of service for sufficient time to cure or be taken to a climate controlled hangar to facilitate cure of the adhesive.

SUMMARY

One aspect of the disclosure involves a method for processing an acoustic panel. The panel comprises: a sheet having a first face, a second face, and apertures open to the first face and second face; and a mesh along the first face. The method comprises forcing the mesh into a plurality of the apertures.

A further embodiment may additionally and/or alternatively include the forcing comprising rupturing.

A further embodiment may additionally and/or alternatively include the rupturing forcing the mesh through the sheet to protrude from the plurality of apertures at the second face.

A further embodiment may additionally and/or alternatively include deforming the mesh to backlock a portion of the mesh along the second face.

A further embodiment may additionally and/or alternatively include the deforming comprising laterally expanding a portion of a tool, the tool extending through at least one of the apertures.

A further embodiment may additionally and/or alternatively include the lateral expanding also axially compressing the mesh relative to an axis of the at least one of the apertures.

A further embodiment may additionally and/or alternatively include the rupturing being caused by an insertion of the tool.

A further embodiment may additionally and/or alternatively include the rupturing comprising piercing the mesh with a tool.

A further embodiment may additionally and/or alternatively include the mesh having suffered a rip or a hole and the method comprising said forcing through said plurality of apertures, said plurality of apertures surrounding the rip or hole.

A further embodiment may additionally and/or alternatively include the mesh having suffered a non-tear delamination and the method comprising said forcing through said plurality of apertures, said plurality of apertures along the delamination.

A further embodiment may additionally and/or alternatively include the forcing being performed with the sheet secured to a honeycomb.

A further embodiment may additionally and/or alternatively include the forcing being into a cell of the honeycomb.

A further embodiment may additionally and/or alternatively include the acoustic panel being a panel of a gas turbine engine.

A further embodiment may additionally and/or alternatively include the forcing being performed with the acoustic panel in situ on the gas turbine engine.

Another aspect of the disclosure involves an acoustic panel comprising: a sheet having a first face, a second face, and apertures open to the first face and second face; and a mesh along the first face and protruding through a plurality of the apertures and backlocked against the second face.

A further embodiment may additionally and/or alternatively include a honeycomb secured to the second face.

A further embodiment may additionally and/or alternatively include: an adhesive securing the mesh to the first face; and the plurality of apertures being along a delamination of the mesh from the sheet.

Another aspect of the disclosure involves a tool for processing an acoustic panel. The acoustic panel comprises: a sheet having a first face, a second face, and apertures open to the first face and second face; and a mesh along the first face. The tool comprises: a body; a shaft extending through a channel in the body and axially displaceable relative to the body between an extended position and a retracted position; a deformable member insertable through one of the apertures and engageable to the shaft and body so that retraction of the shaft from the extended position to the retracted position laterally expands the deformable member and deforms a portion of the mesh protruding through the aperture into a backlocking engagement with the second face.

A further embodiment may additionally and/or alternatively include the body comprising a backing flange positioned to back the mesh along the first face surrounding the aperture during the retraction.

A further embodiment may additionally and/or alternatively include the shaft bearing a piercing tip.

Another aspect of the disclosure involves a tool for processing an acoustic panel. The acoustic panel comprises: a sheet having a first face, a second face, and apertures open to the first face and second face; and a mesh along the first face. The tool comprises: a body extending at least partially through one of the apertures from the first face; and a deformable member in a laterally expanded condition pressing a portion of the mesh protruding through the aperture into a backlocking engagement with the second face.

A further embodiment may additionally and/or alternatively include a shaft extending through a channel in the body and axially displaceable relative to the body between a retracted position associated with the laterally expanded condition and an extended position associated with a laterally contracted condition of the deformable member.

A further embodiment may additionally and/or alternatively include the shaft bearing a piercing tip.

A further embodiment may additionally and/or alternatively include the body comprising a backing flange backing the mesh along the first face surrounding the aperture.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

The details of one or more embodiments are set forth in the accompanying drawings and the description below. Other features, objects, and advantages will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
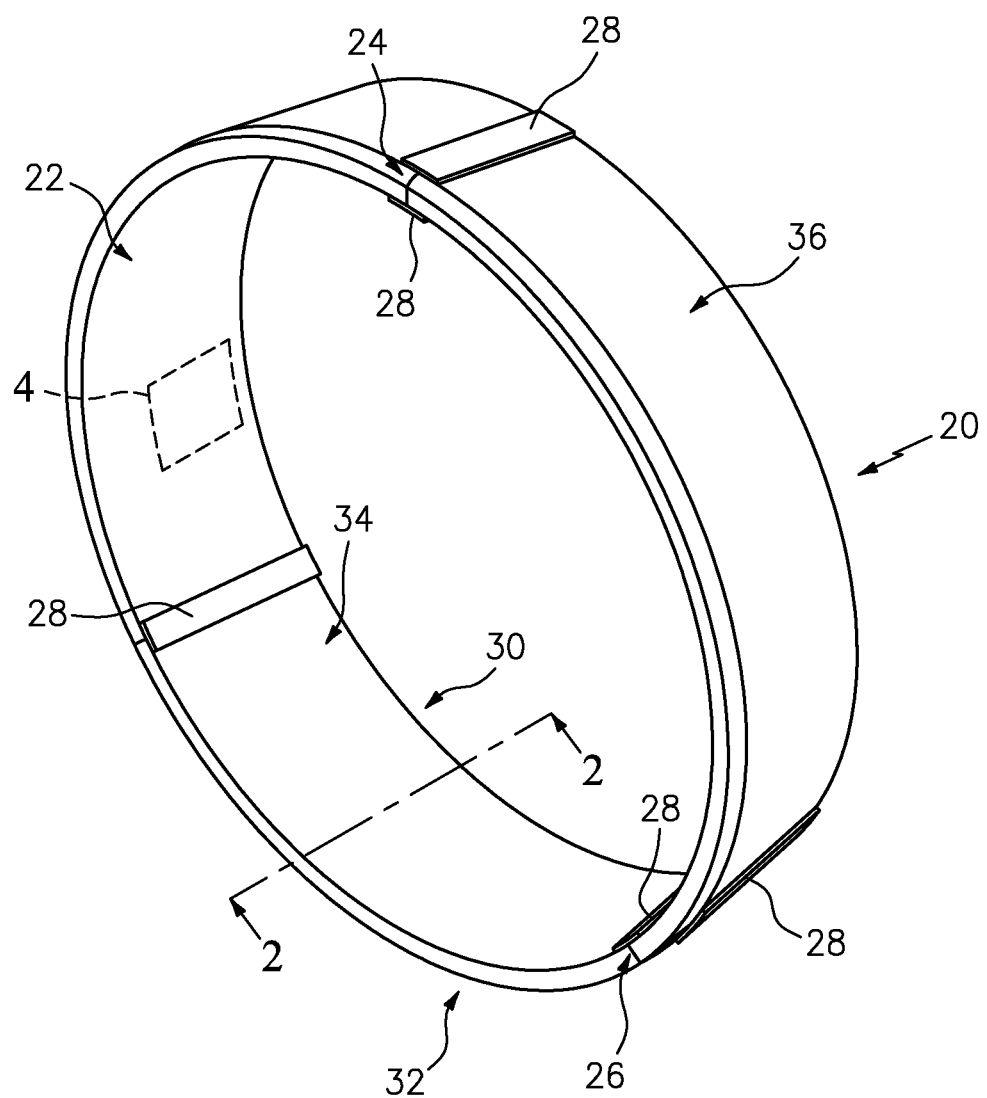
FIG. 1 is a view of a gas turbine engine cowl.

FIG. 1 shows a gas turbine engine component 20 in the exemplary form of an intake cowl. The cowl comprises a circumferential array of segments 22 in the form of panels. Each segment or panel extends circumferentially from a first circumferential end 24 to a second circumferential end 26. The panels are adjoined end-to-end by joints 28. Exemplary joints 28 are in the form of an internal splice and an external splice. The panels extend from a first axial end 30 to a second axial end 32. The exemplary intake cowl first axial end is an upstream or forward end and the second axial end is a downstream or aft end.

Figure 2:
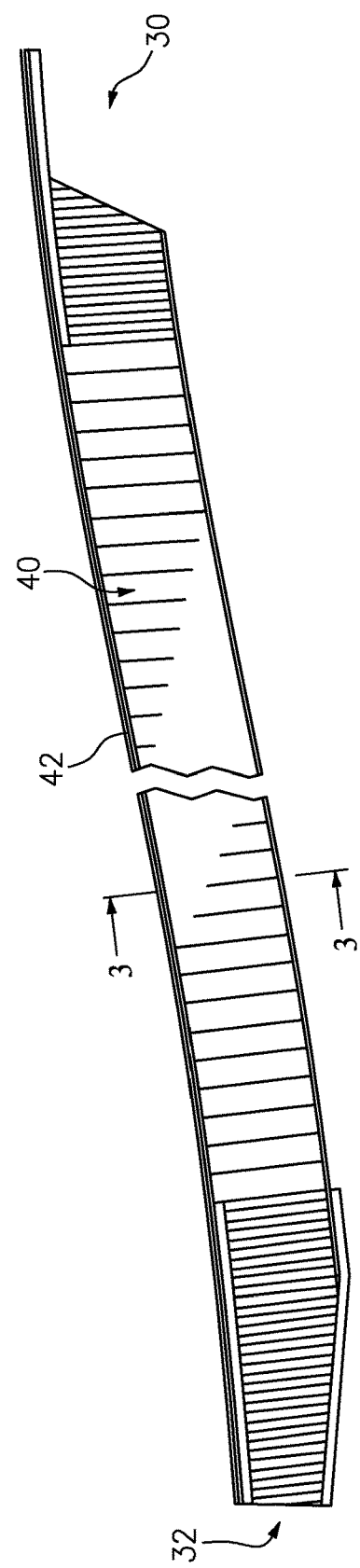
FIG. 2 is a longitudinal sectional view of a panel of the cowl of FIG. 1, taken along line 2-2.

The panel further comprises an interior or inner diameter (ID) surface 34 and an exterior or outer diameter (OD) surface 36. The exemplary panel comprises a core 40 (e.g., honeycomb) (FIG. 2). Along an inboard side or face of the core, the core is secured to a sheet (face sheet) 42. The sheet 42 (FIG. 3) has a first face 44, a second face 46 opposite the first face and spaced apart therefrom by a sheet thickness, and apertures 48 open to the first face and second face. The apertures 48 are defined by associated perimeter surfaces 50. In the exemplary implementation, the first face 44 is an exterior face of the sheet which may face the interior of the intake cowl. The second face 46 forms an interior face of the sheet secured to the core.

Figure 3:
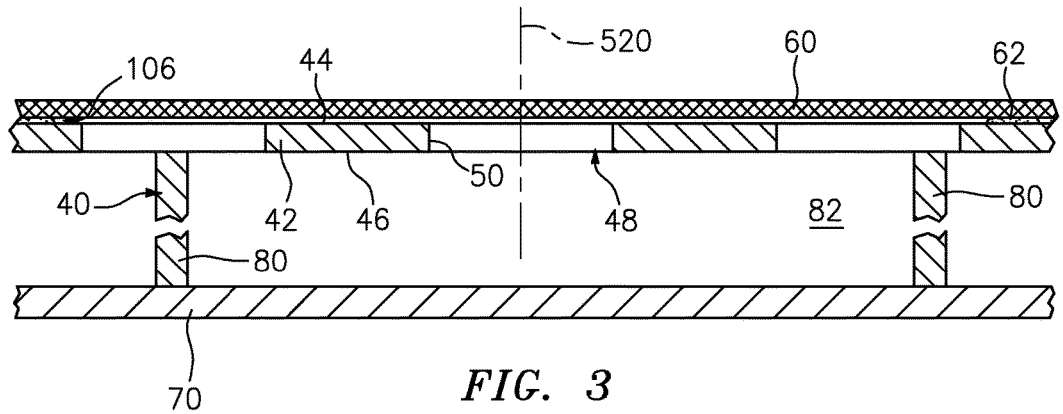
FIG. 3 is an enlarged view of a portion of the panel of FIG. 2

The panel further comprises a mesh 60 along the first face 44 of the sheet 42. The exemplary mesh 60 is a metallic mesh, more particularly, a stainless steel wire mesh (e.g., reverse Dutch twill). The exemplary mesh 60 is secured in place via adhesive 62. FIG. 3 further shows the panel as comprising a second sheet 70. The exemplary second sheet is a backing sheet secured to the second (outboard) side or face of the core. The exemplary backing sheet 70 lacks apertures (e.g., is imperforate). FIG. 3 further shows the core 40 as comprising cell walls 80 surrounding individual cells 82.

Depending upon the relationship between the core 40 and the face sheet 42, the apertures 48 may register with associated cells 82 (e.g., be centered thereon) or, if the aperture array is not identical to the cell array and aligned therewith, there may be variation in alignment of any given aperture with one or more cells and vice versa. Exemplary aperture and cell array sizes may be such that on average the number such as 1-10 apertures communicate with a given cell, more narrowly, 1-5.

In one example, exemplary materials for the core 40, face sheet 42, and backing sheet 70 are aluminum alloys. They may be secured to each other via adhesives such as an epoxy. In alternative implementations, one or all of these may be non-metallic.

Figure 4:
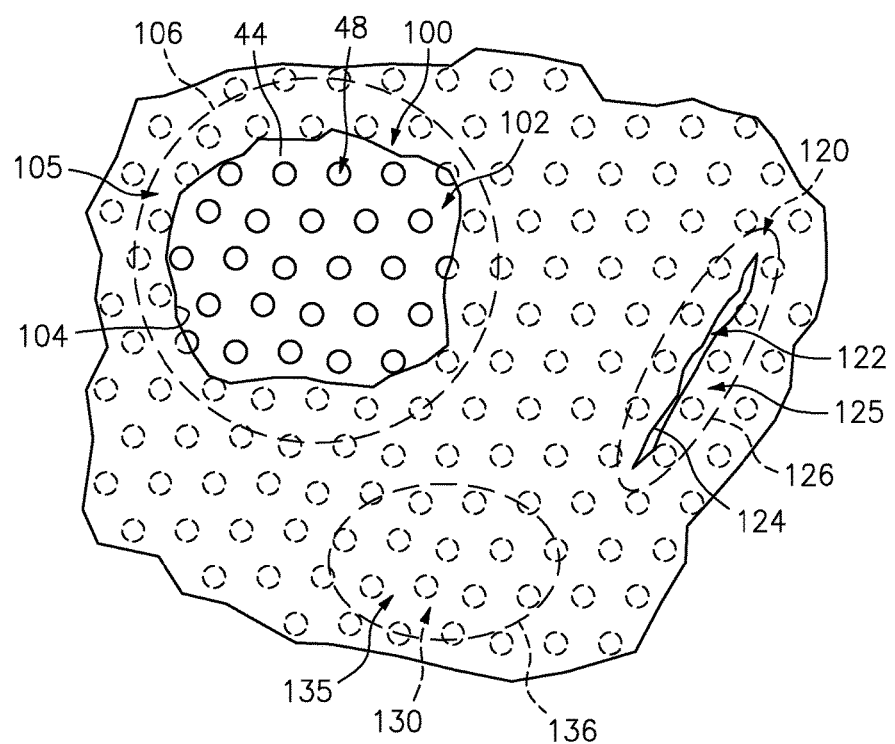
FIG. 4 is an enlarged view of a damage area along an inner surface of the cowl of FIG. 1, at numeral 4.

The exemplary array of the apertures 48 may be a regular array such as a square array or a hexagonal array. FIG. 4 shows an exemplary hexagonal array of apertures. More particularly, FIG. 4 shows a damage site 100 wherein mesh material has been lost leaving a hole 102 in the mesh material having a perimeter or edge or boundary 104. Some zone 105 around the perimeter 104 (e.g., extending to delamination boundary 106) may also have suffered delamination of the mesh from the face sheet.

FIG. 4 also shows a first alternative damage site 120 in the form of a rip or tear 122 having a tear boundary 104 but from which material has not been lost. Again, a delamination area or zone 125 extends to a delamination boundary 126.

FIG. 4 further shows a second alternative damage site 130 which is a mere delamination 135 (having delamination boundary 136) from which no material has been lost.

Figure 5:
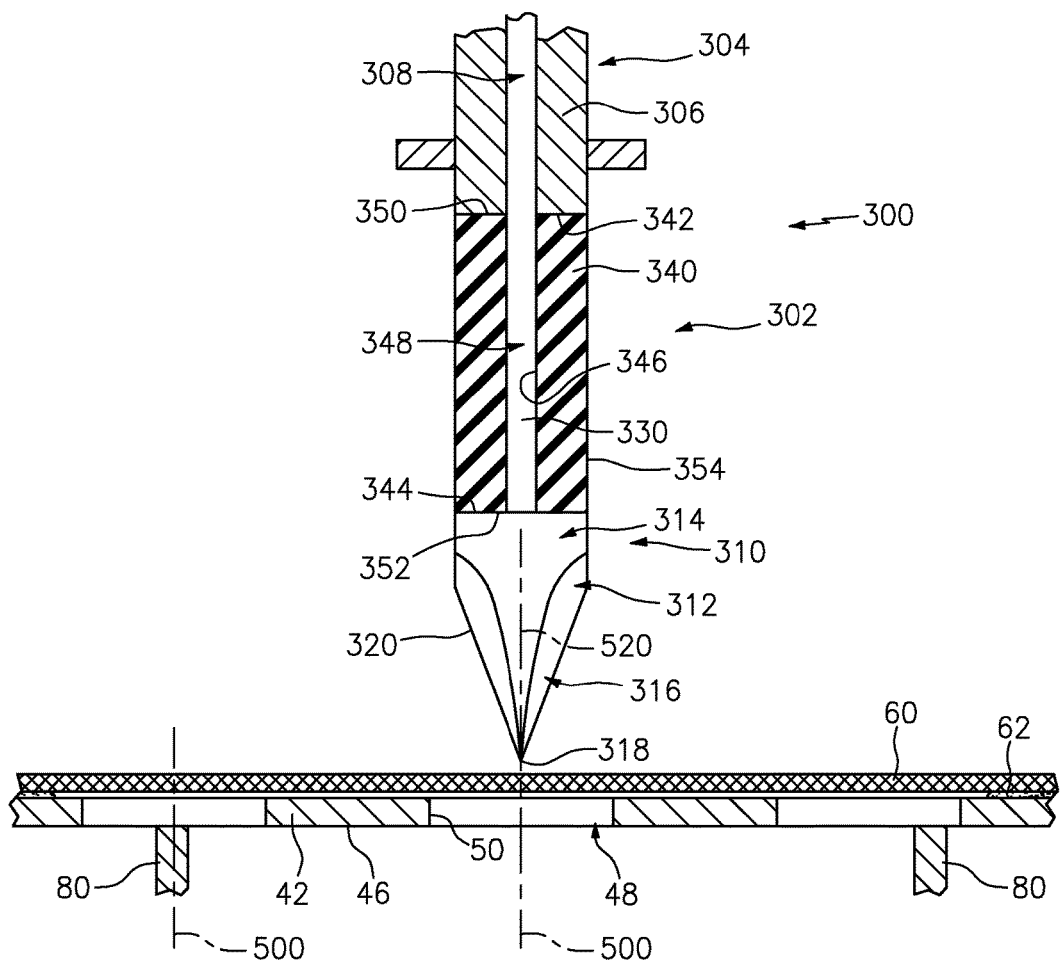
FIG. 5 is a sectional view of a damage site on the panel in a first stage of repair.

It is desirable to secure the delamination so as to prevent further delamination and damage. The exemplary repair serves to locally secure the mesh 60 to the face sheet 42. As is discussed further below, the exemplary repair involves securing the mesh through the apertures 48 in the face sheet at a plurality of locations/apertures in the delamination areas. In the case of a rip or tip or other hole, this may involve surrounding the rip or hole. Exemplary repair involves using a tool 300 having an end effector 302 (FIG. 5) to drive mesh through the face sheet aperture. FIG. 5 shows the end effector 302 having a central longitudinal axis 520 which may be registered/aligned with the central axis of the associated aperture to be addressed. The end effector comprises a body 304. The exemplary body comprises a tubular member 306 having a central longitudinal channel 308 along the axis 520. The end effector further comprises a movable member 310 axially shiftable/displaceable relative to the body 304. The exemplary member 310 comprises an end member 312. The exemplary end member 312 comprises a base 314 and a piercing portion 316 extending from the base 314 to a tip 318. The piercing portion may have sharp edges 320 or other features for cutting, rupturing or otherwise breaking/severing the mesh.

The exemplary member 310 further comprises a shaft 330 extending through the channel 308. As is discussed further below, the exemplary end effector further comprises a deformable member 340 axially sandwiched between a distal end surface 342 of the tubular member 306 and an underside (proximal face) 344 of the base 314. The deformable member 340 comprises a central channel or passageway 348 passing the shaft 330. The deformable member further comprises a proximal end 350, a distal end 352, and a lateral perimeter 354 in addition to the interior surface 346. As is discussed further below, when the portion 300 is retracted relative to the body 304, the deformed member is axially compressed so as to expand.

However, an initial phase of operation occurs with the tool in an extended condition and the deformable member 340 relatively undeformed.

Figure 6:
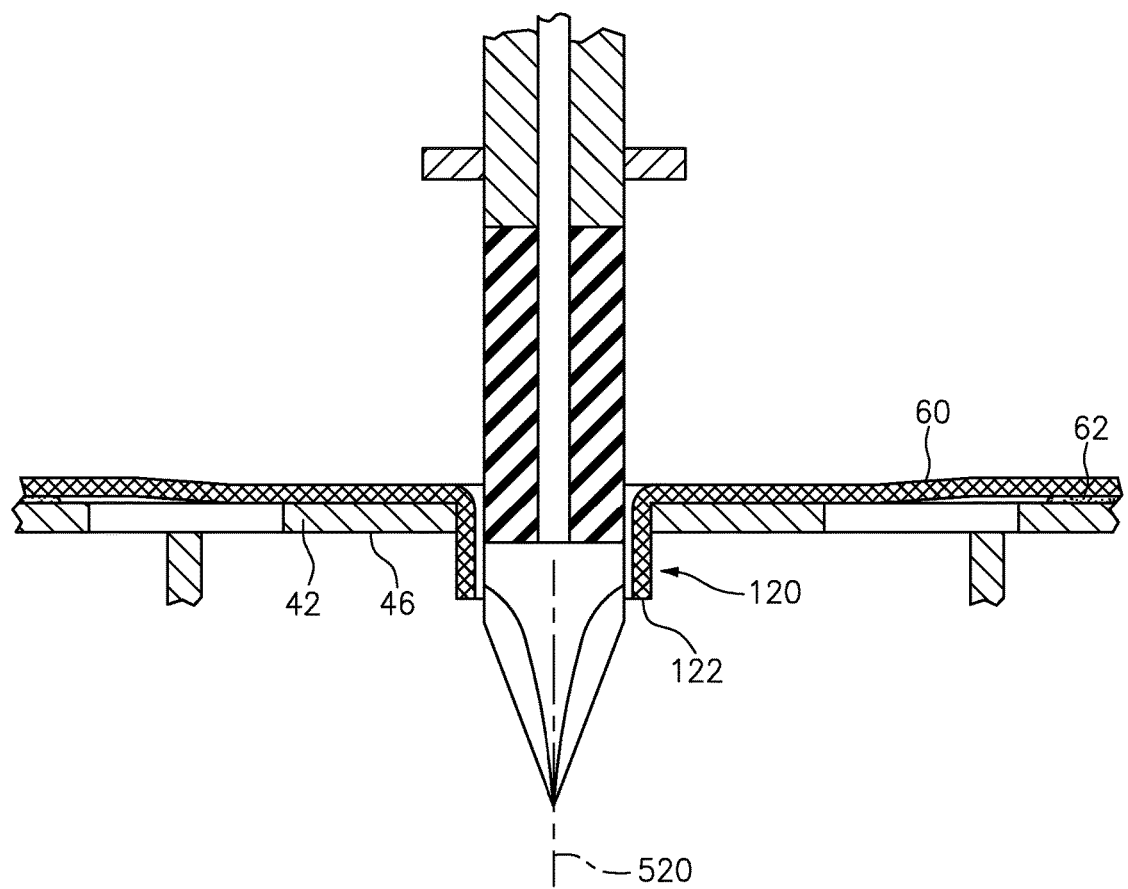
FIG. 6 is a view of the damage site in a second stage of repair.
Figure 7:
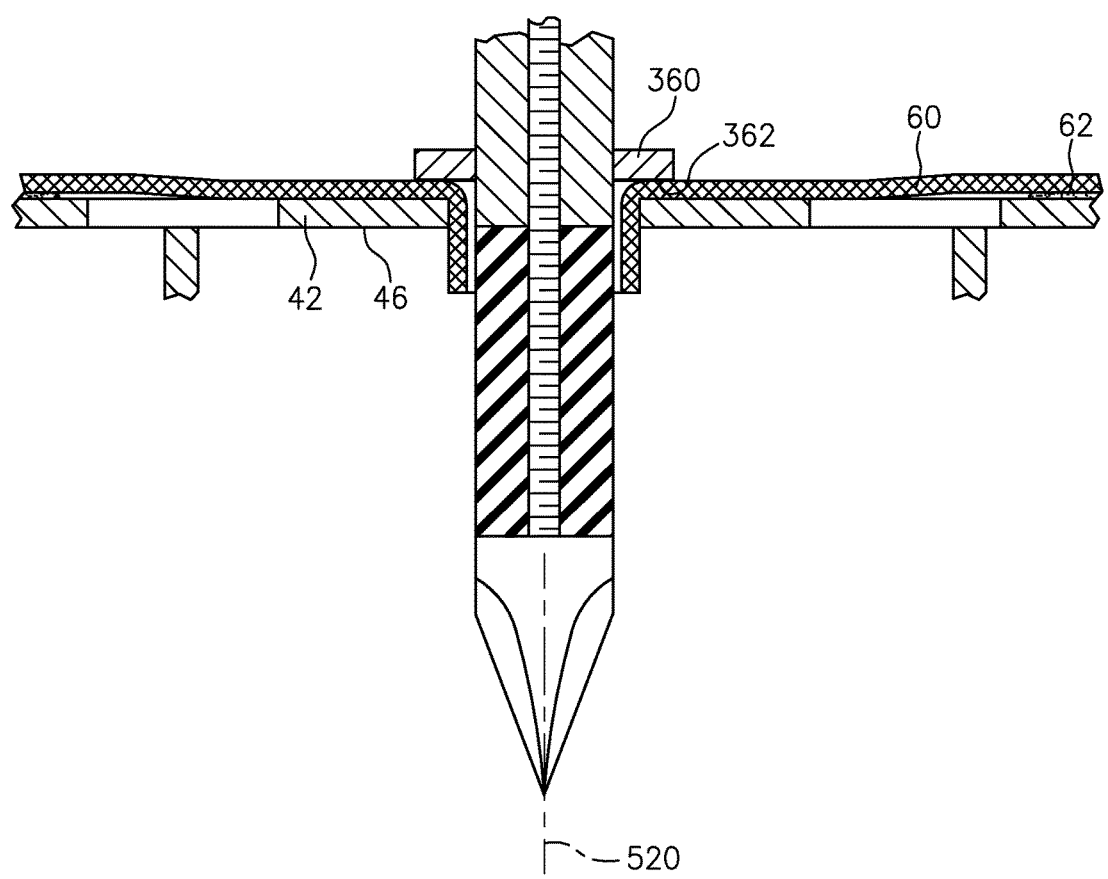
FIG. 7 is a view of the damage site in a third stage of repair.

FIG. 5 shows the tip 318 approaching the exposed surface of the mesh 60. FIG. 6 shows initial penetration wherein a portion 120 of the mesh has been forced through the aperture. In this example, the mesh has been cut, ruptured, or otherwise broken to create an edge 122 of the mesh portion protruding through the aperture. In this example, the material 120 protrudes from the face 46 into the interior of the adjacent cell of the honeycomb. In the event of an aperture intersecting one of the cell walls, the piercing portion may deform the wall away from the aperture. FIG. 7 shows a further stage of insertion wherein the distal face 362 of a flange 360 of the tool bottoms out against the exposed face of the mesh. The exemplary flange 360 is secured to the tubular member 306 (e.g., by welding or interference, if both are metallic, or via adhesive or other weld, if non-metallic).

Figure 8:
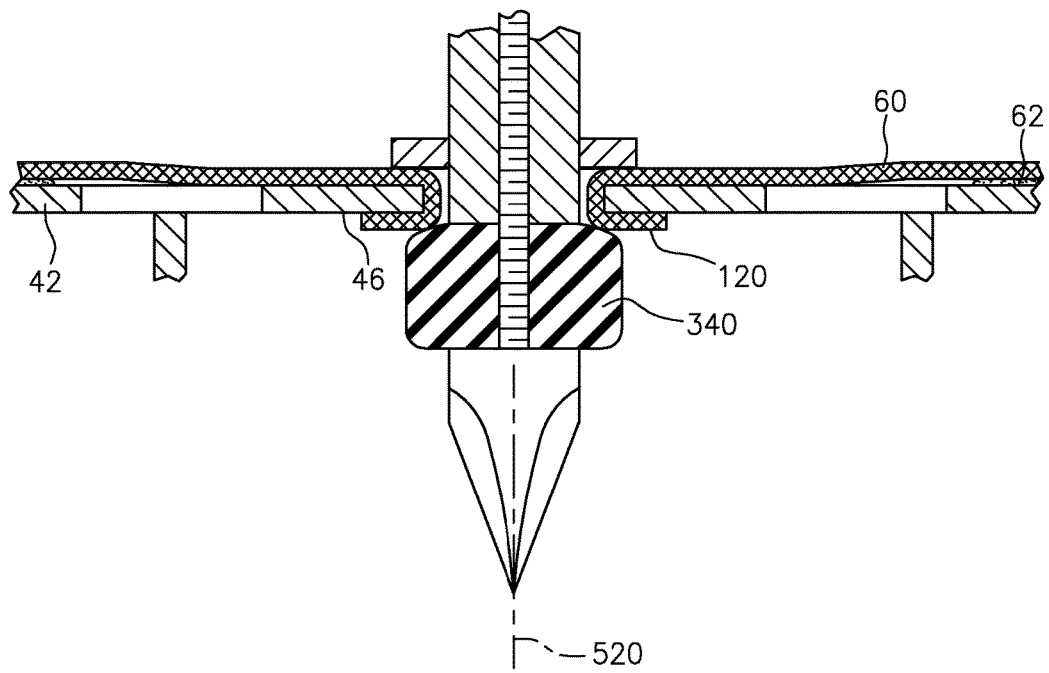
FIG. 8 is a view of the damage site in a fourth stage of repair.
Figure 9:
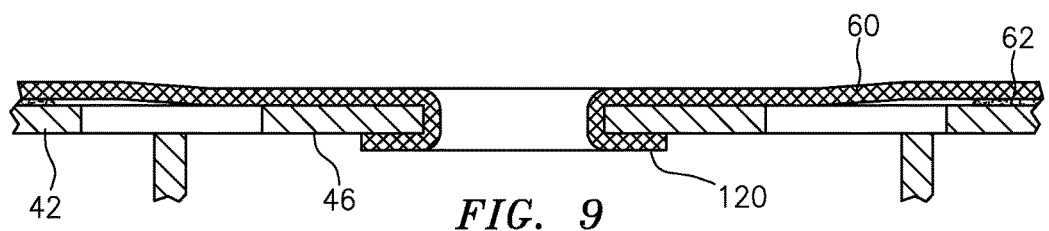
FIG. 9 is a view of the damage site after repair.

Upon bottoming, the member 310 may be retracted relative to the member 304. FIG. 8 shows a retracted condition wherein the deformable member 340 is axially compressed and thus laterally expands. This axial compression and lateral expansion tends to flare the protruding mesh portion 120, pressing it against the face 46 of the face sheet with the flange 360 bearing against the mesh along the face 44. Thereafter, the member 310 may be re-extended, relaxing the deformable member 340 and allowing the end effector to be withdrawn from the aperture leaving a finished secured joint shown in FIG. 9 with the mesh portion 120 backlocked against the face 46. By extending through the sheet from the first face and laterally flaring behind the second face, the backlocking requires deformation of the portion 120 of the mesh to pull back through the sheet.

The process may be repeated for the desired number of locations in the damage site.

Figure 10:
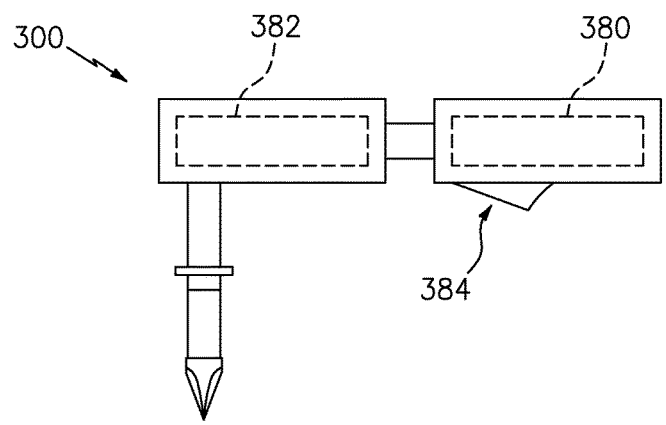
FIG. 10 is a partially schematic view of a repair tool.

FIG. 10 further shows details of exemplary hand-held tool 300 including a power source 380 (e.g., battery), an actuator 382 (e.g., a motor), connected to the power source, and a control member 384 (e.g., trigger switch) to control the power from the battery to engage the motor to retract the shaft 330. Release and re-extension may be passively accomplished by relaxing the strain in the deformable member. An exemplary configuration of the tool 300 is based upon conventional riveting tools. Alternative tools may be pneumatic and/or may be robotic instead of hand-held. An exemplary repair may be performed by a mechanic with the panel in-situ on an engine in-situ on an aircraft.

Among possible advantages relative to adhesive repairs are facilitating a repair with the engine and the panel in situ on the aircraft. This may also avoid the need for repair adhesive cure times and climate control required for curing. This may also limit or avoid occlusion of the mesh by the repair adhesive and thus the sheet apertures along the affected area. Nevertheless, the exemplary methods may be performed in conjunction with use of an adhesive. For example, in a repair situation, the methods may supplement an adhesive repair in areas particularly prone to delamination. Also, the methods may be used in original manufacture or remanufacture situations. Again, in such original manufacture or remanufacture situations, the methods may supplement adhesive in areas particularly prone to delamination.

Although an inlet cowl is shown in FIG. 1, the panel may be located in other areas of a gas turbine engine such as a fan case or an intermediate case and may, particularly, be in a bypass area of the engine nacelle (e.g., the thrust reverser). In general, a number of these locations involve panels that are along the bypass flowpath of a turbofan engine (either always along the flowpath or temporarily such as when a thrust reverser is deployed).

The use of "first", "second", and the like in the following claims is for differentiation within the claim only and does not necessarily indicate relative or absolute importance or temporal order. Similarly, the identification in a claim of one element as "first" (or the like) does not preclude such "first" element from identifying an element that is referred to as "second" (or the like) in another claim or in the description.

Where a measure is given in English units followed by a parenthetical containing SI or other units, the parenthetical's units are a conversion and should not imply a degree of precision not found in the English units.

One or more embodiments have been described. Nevertheless, it will be understood that various modifications may be made. For example, when applied to an existing baseline configuration, details of such baseline may influence details of particular implementations. Accordingly, other embodiments are within the scope of the following claims.

What is claimed is:

1. A method for processing an acoustic panel (22), the panel comprising:
    a sheet (42) having a first face (44), a second face (46), and apertures (48) open to the first face and second face; and
    a mesh (60) along the first face,
the method comprising:
    forcing the mesh into a plurality of the apertures; and
    deforming the mesh to backlock a portion (120) of the mesh along the second face, wherein:
        the forcing comprises rupturing;
        the rupturing forces the mesh through the sheet to protrude from the plurality of apertures at the second face; and
        the deforming comprises laterally expanding a portion (340) of a tool (300), the tool extending through at least one of the apertures.

2. The method of claim 1 wherein:
    the lateral expanding also axially compresses the mesh relative to an axis (500) of the at least one of the apertures.

3. The method of claim 1 wherein:
    the rupturing is caused by an insertion of the tool.

4. The method of claim 1 wherein:
    the rupturing comprises piercing the mesh with the tool (300).

5. The method of claim 1 wherein:
    the mesh has suffered a rip (122) or a hole (102); and the method comprises said forcing through said plurality of apertures, said plurality of apertures surrounding the rip or hole.
6. The method of claim 1 wherein:
the mesh has suffered a non-tear delamination (130); and
the method comprises said forcing through said plurality of apertures, said plurality of apertures along the delamination.
7. The method of claim 1 wherein:
the forcing is performed with the sheet secured to a honeycomb (40).
8. The method of claim 7 wherein:
the forcing is into a cell (82) of the honeycomb (40).
9. The method of claim 1 wherein:
the acoustic panel is a panel of a gas turbine engine.
10. The method of claim 9 wherein:
the forcing is performed with the acoustic panel in situ on the gas turbine engine.

\* \* \* \* \*